May 8, 1928.
V. R. DESPARD ET AL
1,669,373
OPERATING MEANS FOR ROTARY SWITCHES
Filed Oct. 16, 1925    2 Sheets-Sheet 2
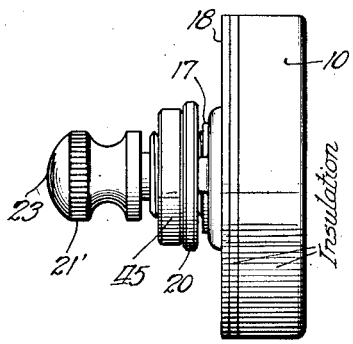
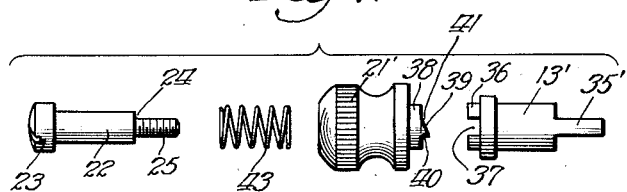
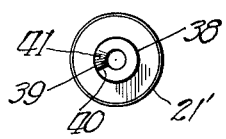
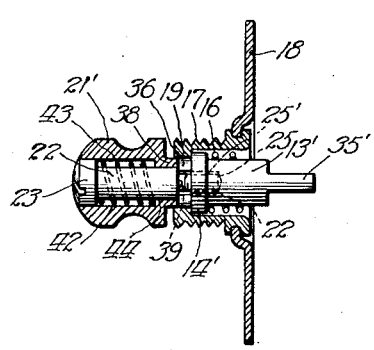
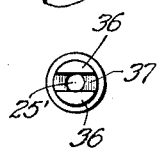
Inventors:
Victor R. Despard.
Hans C. R. Popp.

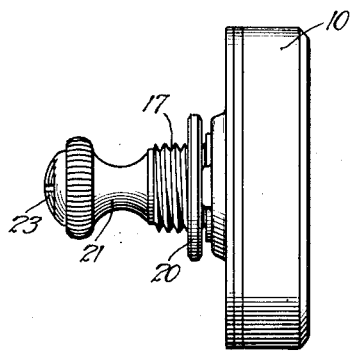
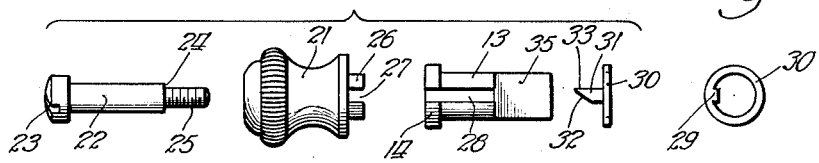
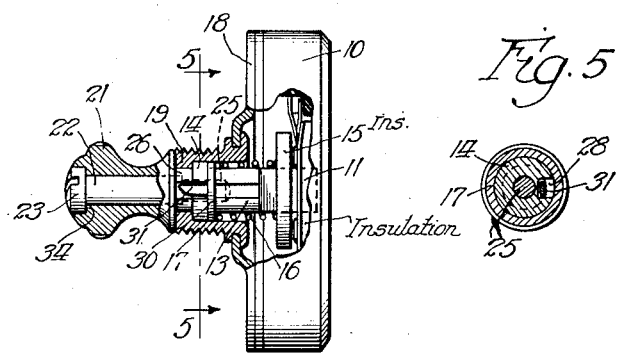

Patented May 8, 1928.

1,669,373

UNITED STATES PATENT OFFICE.

VICTOR R. DESPARD AND HANS C. R. POPP, OF VALPARAISO, INDIANA, ASSIGNORS TO McGILL MANUFACTURING COMPANY, A CORPORATION OF INDIANA.

OPERATING MEANS FOR ROTARY SWITCHES.

Application filed October 16, 1925. Serial No. 62,834.

Our invention relates to operating means for rotary switches and more particularly to operating means for rotating a switch always in the same direction.

It is a purpose of our invention to provide means for operating a rotatable switch mechanism comprising a rotatable member which comprises an operating member and a ratchet connection between the operating member and the rotatable member whereby said operating member can only rotate the rotatable member in one direction. This is particularly important as the rotatable member and the operating means are connected by means of a screw-threaded device and if its rotation in a rearward direction were possible, the tendency would be for the screw-threaded means to become disengaged from the rotatable member, thus disassembling the operating member therefrom.

More particularly it is a purpose of our invention to provide in a switch mechanism rotatable means for rotating the member comprising an operating member, one of said two members having a recess therein preferably in the form of a transverse groove in the end of said member and the other having a ratchet tooth engaging in said recess or transverse groove and resilient means for yieldingly holding the member with the ratchet tooth in engagement in the recess. The tooth may be either on the rotatable member or on the operating member. When the tooth is on the operating member, the resilient means is preferably mounted on the securing means which is in the form of a screw. While if the tooth is provided on the rotatable member, the resilient means used for engaging the contacts in the switch mechanism with each other yieldingly is employed for operating the ratchet tooth. In this latter form of the invention, the ratchet tooth is preferably slidably mounted for longitudinally guided movement on the rotatable member and the resilient means embraces said rotatable member.

Other objects and advantages of the invention will appear as the description of the accompanying drawings proceeds. However, we desire to have it distinctly understood that we do not intend to limit ourselves to the exact details shown or described, but that we intend to include as part of our invention all such obvious changes and modifications of parts as would occur to a person skilled in this art and as would fall within the scope of the claims.

In the drawings:

Fig. 1 is a view in side elevation of a switch mechanism embodying our improved operating means;

Fig. 2 is a side elevational view of the elements of the operating means in separated relation to more clearly show the construction of the parts;

Fig. 3 is a view partly in section and partly in elevation of a switch embodying my improved operating means;

Fig. 4 is an end view of the member having the ratchet tooth thereon;

Fig. 5 is a section taken on the line 5—5 of Fig. 3;

Fig. 6 is a view similar to Fig. 1 of another form of the invention;

Fig. 7 is a view similar to Fig. 2 of said last mentioned form;

Fig. 8 is a fragmentary section of the operating means in operating position;

Fig. 9 is an end view of the ratchet toothed member; and

Fig. 10 is an end view of the grooved member cooperating with the ratchet toothed member.

Referring in detail to the drawings in Figs. 1 to 3 inclusive is shown one form of our invention in which the switch member 10 is provided with a suitable rotatable contact member 11 having contact means thereon cooperating with the stationary contacts 12. A rotatable member 13 is provided for rotating the member 11 and is provided with a shoulder 14 between which and an insulating washer 15 is mounted a coil compression spring 16 that yieldingly holds the contact members on the movable contact carrying member 11 in engagement with the stationary contacts 12. A hollow tubular projection 17 extends from the cover member 18 of the switch member 10 and the member 13 extends into said hollow tubular member 17 with the end thereof at the shoulder 14 engaging with the inwardly extending flange or shoulder 19 on the member 17 to limit outward movement of the member 13. The member 17 is externally screw-threaded and receives the internally screw-threaded nut or washer 20 for clamping the switch in position on any suitable support.

An operating member or knob 21 is provided extending endwise beyond the tubular member 17 and is secured in position by means of a screw-threaded member 22 having a head 23 for receiving the screwdriver and provided with a shoulder 24 and a reduced screw-threaded end 25. The screw-threaded end 25 is screw-threadedly received within the member 13 so as to secure the operating member 21 thereto. The operating member 21 is provided with a projection 26 having a transverse slot 27 therein which faces the member 13. Said member 13 is provided with a slot 28 on one side thereof for receiving the inward projection 29 on the collar 30 which is provided with a projecting tooth 31 having an inclined face 32 and a perpendicular face 33 thus forming a ratchet tooth that is adapted to project into the slot or recess 27. The collar 30 is placed between the end of the spring 16 and the shoulder 14 and has a tendency to press the collar 30 against said shoulder as well as to hold the stationary and movable contacts of the switch mechanism in yielding engagement. The shoulder 24 on the member 22 engages with the outer end of the member 13 at the flange 14 when the parts are in assembled relation. The relative length of the knob 21 from the bottom of the recess 34 provided therein for receiving the head 23 of the screw and the end of the member 17 to the length of the enlarged portion 22 of the screw from the head to the shoulder 24 is such that the member 21 is rotatable freely on the member 22, but does not have any appreciable amount of play. As the projection 26 fits snugly within the reduced portion of the member 17 formed at the flange 19 but is freely rotatable therein, any play will be practically entirely eliminated.

If the member 21 is rotated in a rearward or counter-clockwise direction, the inclined face 32 of the tooth 31 will ride out of the groove 27 and no rotation of the member 13 will take place. However, if the member 21 is rotated in a clockwise direction, the tooth 31 will enter the transverse groove 27 due to the action of the spring 16 and the member 13 will rotate with the operating member 21, the flattened end 35 of the member 13 entering a suitable opening in the rotatable member 11 to rotate the same therewith. A very simple and compact construction is obtained by this arrangement with a minimum number of parts.

In Figs. 4 to 6 inclusive another form of the invention is shown in which the switch mechanism is indicated by the same numerals as in Figs. 1 to 3 inclusive as well as the cover member and the hollow screw-threaded tubular member projecting therefrom. The various parts of these elements are also indicated by the same numerals as in the first described form of the invention. The rotatable member 13' in this form of the invention corresponds to the member 13 in Figs. 1 to 3 inclusive and is provided with a flattened end portion 35'. An annular shoulder 14' is provided on this member engaging with the flange 19 and the spring 16 holds said flange 14' in engagement with the flange 19. The member 13' is, however, provided with an outward projection 36 which is provided with a transverse slot or groove 37 providing a recess in the outer face of the member 13'. The operating member 21' on the other hand is provided with a projection 38 extending toward the member 13' which is provided with a ratchet tooth 39 which tooth has a face extending substantially at right angles to the forward face of the projection 38 at 40 and an inclined face at 41. The member 21' is provided with an enlarged bore 42 through which the enlarged portion of the screw-threaded securing member 22 passes, said member having a head 23 as previously described and a shoulder 24 between the enlarged portion thereof and the reduced screw-threaded portion 25.

The head 23 of the screw also is mounted in the bore 42 and the coil spring 43 surrounds the member 22 and extends from the head 23 to the annular shoulder 44 provided in the member 21', the spring 43 being compressed between the head 23 and the shoulder 44 when the screw 22 is threaded into the member 13', a screw-threaded opening 25' being provided for receiving said screw 22 in the member 13'.

The member 21' will be drawn yieldingly toward the end of the hollow tubular member 17 and the tooth 39 will tend to seat in the groove 37 when the member 21' is rotated in a clockwise direction. While if it is rotated in a counter-clockwise direction, the inclined face 39 will ride out of the slot 37 compressing the spring 43 and moving the member 21' outwardly so as to disengage the same from the member 13' whereupon no rotation of the member 13' will take place, it being obvious, of course, that when the clockwise rotation of the member 21' takes place, the member 13' rotates therewith. The screw-threaded member 17 in this form of the invention is also provided with the screw-threaded nut 20 and in addition with the locking nut 45 if desired.

Having thus described our invention what we desire to claim and secure by United States Letters Patent is:

1. In a switch operating mechanism a rotatable contact carrying means, an operating member for rotating said means slidably engaging therewith and having at one end a transverse groove, a securing member projecting from said grooved end of said operating member, a handle member having a ratchet tooth thereon slidably and rotatably carried by said securing member, spring means pressing said handle member toward said first named member and spring means pressing said first named member away from said contact carrying means.

2. In a switch operating mechanism a rotatable contact carrying means, an operating member for rotating said means slidably and non-rotatably engaging therewith, a handle member slidably and rotatably carried by said first named member, a securing pin for securing said members together, one of said members having a groove therein and the other having a ratchet tooth extending therefrom to engage said groove and a spring loosely mounted on said first named member between said contact carrying means and a shoulder on said first named member to press said ratchet tooth and slot into engagement.

3. In a switch operating mechanism, a rotatable contact means, a member slidably and non-rotatably engaged therewith at one end, resilient means urging said member away from said means, means for limiting the movement of said member away from said contact means and a handle rotatably and slidably secured to said member at the end opposite said contact means, said handle and member having cooperating engaging means thereon causing said member to move with said handle in one direction of rotation and permitting the handle to rotate in the opposite direction without rotating said member.

In witness whereof, we hereunto subscribe our names this seventh day of October A. D., 1925.

VICTOR R. DESPARD.
HANS C. R. POPP.